Sept. 13, 1932.  C. V. ZOUL  1,876,820
METHOD OF OBTAINING OIL AND OTHER PRODUCTS FROM OLIVES
Filed Feb. 27, 1928  2 Sheets-Sheet 1
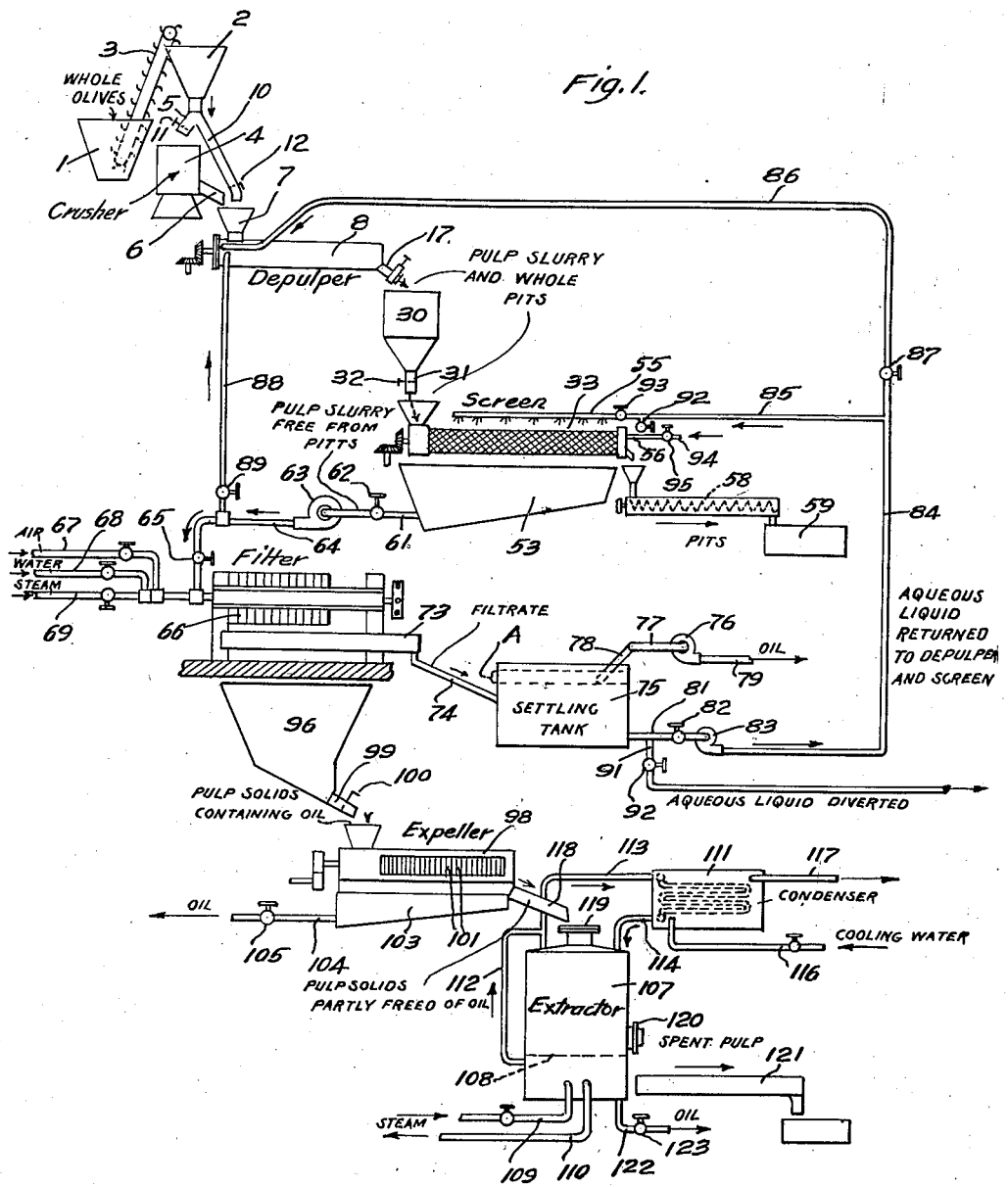

Sept. 13, 1932.  C. V. ZOUL  1,876,820
METHOD OF OBTAINING OIL AND OTHER PRODUCTS FROM OLIVES
Filed Feb. 27, 1928   2 Sheets-Sheet 2
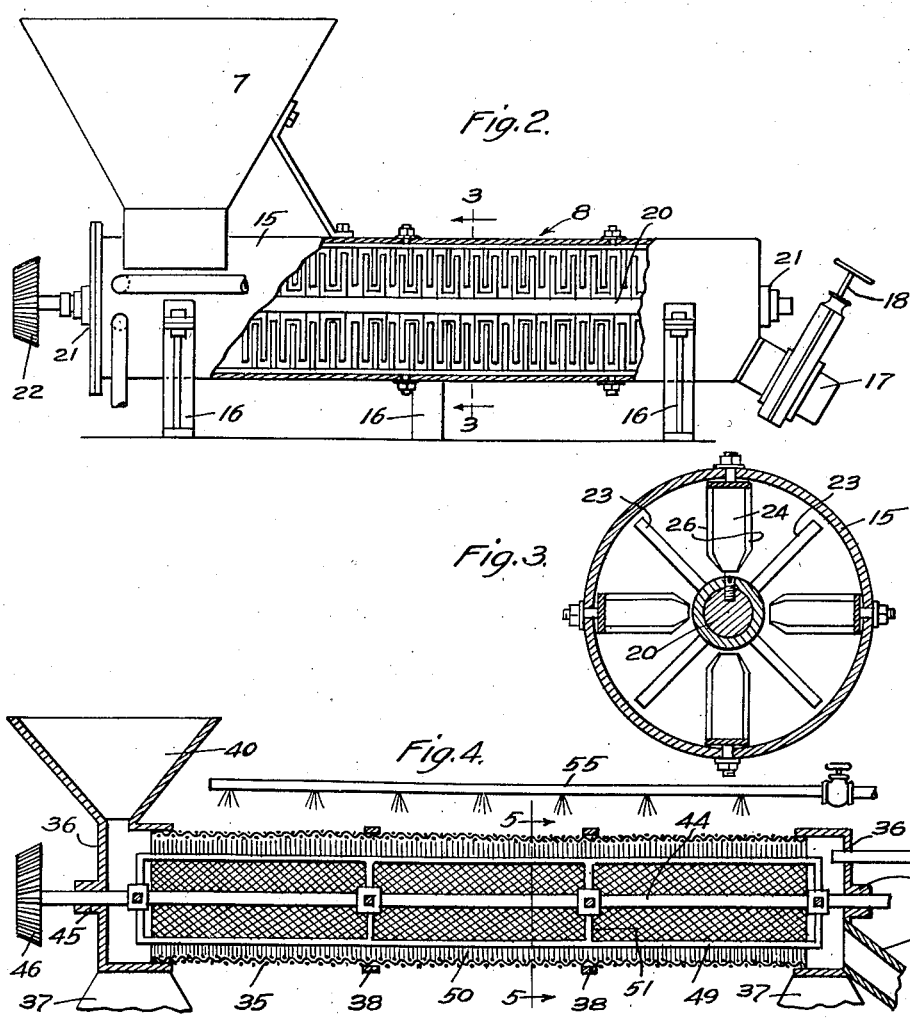
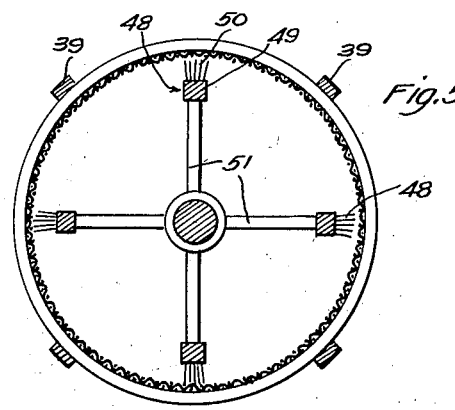

Patented Sept. 13, 1932

1,876,820

UNITED STATES PATENT OFFICE

CHARLES V. ZOUL, OF LOS ANGELES, CALIFORNIA

METHOD OF OBTAINING OIL AND OTHER PRODUCTS FROM OLIVES

Application filed February 27, 1928. Serial No. 257,211.

This invention relates to the treatment of olives for the extraction or recovery of the oil contained in the pulp thereof and also for the recovery of the pulp, after extraction of the oil, in a marketable condition.

The principal object of the invention is to provide for the extraction of the maximum amount of oil from the pulp, with the least possible expenditure of time and money and in the highest possible degree of purity, and to also permit the recovery of the pulp after extraction of the oil in an edible condition and free from contamination by the woody material contained in the pits.

Further and more particular objects of the invention are:

1. To decrease the loss of oil in the pulp by separating the pits from the pulp before crushing and extracting the oil, whereby the oil usually carried off by absorption in the woody material of the crushed pits is saved.

2. To recover substantially all of the oil by subjecting the pulp only once to the necessary oil extracting operations, as distinguished from the repeated crushing and extracting found necessary in the methods heretofore used.

3. To prevent or minimize decomposition or fermentation of the oil by separating the water and the woody material of the pits from the pulp at an early stage in the process and by diminishing the time of contact of the oil with the pulp.

4. To finally obtain a pulp which is substantially free from oil and is uncontaminated by woody material from the pits so that the same may be sold as a highly nutritious cattle food.

In the methods heretofore employed for obtaining oil from olives, the olives are first subjected to a relatively coarse crushing operation so as to break down the pulp to a certain extent, and are then subjected to a hydraulic pressing or other operation for expressing part of the oil or water content thereof. The remaining material is then subjected to a further crushing operation and a second expressing operation and this is repeated until the desired recovery of oil is obtained. This repeated treatment is necessitated by the fact that if it were attempted to crush the olives to the final state of fineness in one operation, the relatively large amount of water and oil liberated therefrom in such crushing would produce a sludge which would be much too thin or fluent to handle in hydraulic presses or other apparatus for removing the oil therefrom, and the process must therefore be carried out in stages as above described. As a result, part of the oil remains in contact with the pulp for a long period of time and at a relatively high temperature and in the presence of considerable amounts of water. Ideal conditions are thus afforded for fermentation and decomposition of the oil and formation of various products of such reactions which contaminate the final products.

Furthermore, in the successive crushing operations the pits are broken up and remain with the pulp, and the presence of this woody material not only assists in promotion of the fermentation reactions causing decomposition of the oil and absorbs a portion of the oil, but also contaminates the final pulp and prevents its use as a cattle food. The crushing of the pits along with the pulp is, therefore, purely detrimental since the amount of oil occurring in the pits themselves (that is in the kernels) is practically negligible, being in general a very small percentage of the total oil in the olive. As a matter of fact, the crushed pits often carry out of the process, by absorption, a greater amount of oil than that which they originally contained.

According to my process, on the other hand, the pits and the major portion of the water content of the pulp are removed as soon as possible so that not only are the operating conditions improved and a better quality of oil produced but also the pulp is recovered in marketable condition. Briefly, the process consists in first removing and separating the pulp from the pits without crushing the pits, but in such manner as to crush the pulp to a fine or mushy condition with the aid of the pits acting as grinding media, then removing the water and oil thus liberated from the pulp by means of a filtering or other separating operation, and then expressing, extracting, or recovering the remaining oil from the pulp by any suitable or well known means, such as are commonly used for the recovery of other vegetable oils.

The substantially complete crushing of the pulp which accompanies the removal thereof from the pits is sufficient to liberate the major portion of the water content so that the subsequent filtering or other separating operation serves to remove most of the water. A certain percentage of the oil will also be generally liberated in this crushing operation, and such oil will be separated from the pulp, together with the water, but may readily be separated from the water by means of a simple settling operation or by other means well known in the art.

The method which I use for removing the pulp from the pits and crushing such pulp consists in subjecting the olives to repeated rubbing or mashing operation in the presence of the pits and in suspension in an aqueous liquid medium including aqueous liquid liberated from the olives during the crushing and preferably also including additional aqueous liquid introduced into the de-pulping operation, such additional aqueous liquid advantageously consisting of liquid separated from a previously crushed portion of the pulp, and this method constitutes an essential part of my invention.

The accompanying drawings illustrate apparatus which may be advantageously used for carrying out the process of my invention and referring to these drawings:

Fig. 1 is a diagrammatic flow sheet showing a complete apparatus adapted for carrying out the process.

Fig. 2 is a partly sectional side elevation of a de-pulping apparatus.

Fig. 3 is a section on line 3—3 in Fig. 2.

Fig. 4 is a longitudinal section of an apparatus for separating the disintegrated pulp from the pits.

Fig. 5 is a section on line 5—5 in Fig. 4.

The apparatus shown in Fig. 1 comprises a bin or receiving chamber 1, a hopper 2, a bucket elevator or other device 3 for delivering olives from bin 1 to hopper 2, preliminary crusher 4 and chute 5 for discharging olives from hopper 2 into crusher 4. Said crusher may be of any suitable type adapted to partially crush the olives without crushing the pits, for example, it may be a roll crusher. From crusher 4 the olives may be delivered through chute 6 and hopper 7 into the de-pulping apparatus or de-pulper 8. A chute 10 may also be provided leading directly to hopper 2 to hopper 7 and chutes 5 and 10 may be provided respectively with gate means 11 and 12 so that the olives may be fed from hopper 2 through crusher 4 and thence to hopper 7 or may be fed directly from hopper 2 to hopper 7, depending upon whether it is desired to subject the same to a preliminary crushing operation before they enter the de-pulper.

The de-pulping apparatus 8 may comprise, as shown more particularly in Figs. 2 and 3, a cylindrical shell or casing 15 extending either horizontally or inclined downwardly somewhat in the direction of travel of the olives therethrough, said casing being mounted, for example, upon supporting standards 16. Said casing is closed at both ends and the hopper 7 is mounted above the fed end thereof so as to deliver the olives to the interior of said casing adjacent this end. Suitable means such as spout 17 provided with gate means 18 may be provided at the bottom of casing 15 for discharging the crushed pulp or slurry and the pits from the end opposite the hopper 7.

A shaft 20 may extend longitudinally of the casing 15 and may be rotatably mounted in bearings 21 at the ends of said casing and provided at one end with driving means such as bevel gear 22 which may be driven in any suitable manner to rotate said shaft at the desired rate of speed. At intervals along the shaft 20 are mounted sets of radially projecting arms 23, while inwardly projecting arms 24 are mounted alternately upon casing 15. The sets of inwardly projecting arms 24 and outwardly projecting arms 23 are arranged in alternate transverse planes throughout the length of the casing and are spaced from one another by a distance less than the average thickness of the olives to be handled but somewhat greater than the thickness of the pits thereof. The arms 23 and 24 may be of any shape and size, such as may be found to produce the most effective action. Arms 23 may, for example, be formed as square or rectangular bars, while the arms 24 may be formed as bars tapering or sharpened at their edges as indicated at 26. It will be seen that by rotation of shaft 20 at a moderate speed in either direction, while feeding olives through hopper 7 into one end of casing 15, the arms 23 and 24 will cooperate to break down or disintegrate the pulp of the olives and at the same time to remove or loosen such pulp from the pits, but will not crush or break the pits owing to the fact that the spacing between the arms is greater than the thickness of the pits. The continual feeding of the olives into the casing at one end will cause the olives while being disintegrated to be continually forced toward the other end of the casing, the movement thereof being facilitated due to the semi-fluid nature of the mass resulting from the disintegrating operation, and will be discharged as a mixture of disintegrated or crushed pulp and whole uncrushed pits through spout 17, the rate of discharge and consequently the length of time the olives remain in the de-pulper being controlled by adjustment of gate means 18. A certain proportion of water or aqueous liquid may be introduced into the feed end of the de-pulper through pipe 86 as is hereinafter described.

A hopper or bin 30 is provided in position to receive the material discharged through spout 17, such hopper serving to provide storage means at this point to compensate for slight fluctuations in the rate of passage of the material through the de-pulper. From said bin the material is fed through outlet 31 at a rate controlled by gate means 32 into a screening or separating device 33 for separating the disintegrated pulp from the pits. Such separating device, as shown more particularly in Figs. 4 and 5, comprises a cylindrical screen 35 secured at its ends to supporting members 36 mounted upon supporting blocks 37. Said screen may be mounted with its axis horizontal or inclined somewhat downwardly in the direction of passage of the material therethrough. Additional supporting rings 38 may be provided for the screen at intermediate points, said supporting rings being secured to longitudinal frame members 39 which are in turn secured to supporting members 36. The screen is of such mesh as to permit the disintegrated pulp to pass therethrough while preventing passage of the pits. A feeding hopper 40 may be mounted at one end of the separating device to receive the material delivered from hopper 30, while said device may be provided with a discharge chute or spout 41 for delivering the pits from the lower portion of the device at the other end.

A shaft 44 is rotatably mounted in bearing means 45 and provided with suitable driving means such as bevel gear 46 which may be driven in any suitable manner. Suitable brush means are mounted upon said shaft in such position as to engage or pass in close contact with the interior of screen 35, such brush means comprising, for example, four or any suitable number of brush members 48 extending throughout the length of the screen and each comprising a longitudinal frame member 49 having bristles 50 secured thereto in any suitable manner and connected at suitable intervals as by means of radial arms 51 to shaft 44.

A suitable tank or vessel 53 is provided beneath the entire length of screen member 35 so as to receive the disintegrated pulp material passing through said screen. In order to assist in the loosening of the pulp from the pits and the complete separation thereof, suitable spray means such as perforated pipe 55 may be provided above the screen 33 for spraying water or aqueous liquid onto and through said screen and additional spray or nozzle means 56 may also extend into the discharge end of said screen for spraying water or aqueous liquid directly onto the material within the screen. The clean pits may be carried off in any desired manner as by means of screw conveyor 58, which is shown as delivering the pits to a storage bin 59 whence they may be disposed of in any suitable manner.

From tank 53 a pipe 61 provided with valve 62 leads to pump 63, whence pipe 64 provided with valve 65 leads to filter press or other mechanical separating apparatus 66 for effecting a mechanical separation of the pulp from the water and from such oil as is separable by such means. Said filter press may be of any suitable or well known type, having filter media adapted to permit passage of free liquid therethrough under pressure created by pump 63 while retaining the pulp and the portion of the oil which still remains absorbed therein. Pipes 67, 68, and 69 may also be provided for delivering air, water and steam respectively to the filter press in the usual manner for washing, steaming and drying the pressed cake, that is, the pulp material held back by the filter media. The filtrate from the filter press may be collected in trough 73 whence pipe 74 leads to settling or separating tank 75. Suitable means may be provided for removing from the upper portion of tank 75 the oil which separates from the water therein by gravity, such oil rising to the top of the water due to its lower specific gravity. The means for this purpose may comprise a pump 76 whose intake pipe 77 is provided with a swinging connection 78 which may be brought to any desired level in the tank in order to permit removal of oil alone therethrough. The outlet of pump 76 may be connected by pipe 79 to any desired point for storage or further treatment of the oil withdrawn thereby from tank 75.

From the lower portion of tank 75 a pipe 81 provided with valve 82 leads to pump 83. From the outlet of said pump, pipes 84 and 85 lead through regulating valves 92 and 93 to spray means 55 and 56 while pipe 86 provided with valve 87 leads to the de-pulper 8, opening into the interior of the casing 15 preferably near the feed end thereof so as to deliver water or liquid from tank 75 thereto. Pipe 88 provided with valve 89 may also be provided leading from the outlet of pump 63 to the feed end of de-pulper 8 so that if desired a portion of the disintegrated pulp may be returned to the de-pulper for further crushing. A pipe 91 provided with valve 92 may also lead from tank 75 or pipe 8' to permit removing from the process either continuously or intermittently sufficient water or liquid (other than oil) to compensate for the water derived from the pulp. Pipe 94 may also be connected through valve 95 to spray or nozzle 56 for introduction of fresh water, if desired.

Instead of the filtering apparatus 66 it will be understood that any other suitable form of mechanical separating means such as centrifugal separators may be provided for separating the water and liberated oil from the pulp. If centrifugal separators are employed, the operation may be so carried out as to separate the oil, due to its lighter specific gravity, from the mixture of pulp and water.

Beneath filter press 66 and in position to receive the pulp or press cake discharged therefrom, or in position to receive the pulp discharged from whatever form of separating means is employed, there is provided a bin or hopper 96 for storage of such pulp. The particular apparatus provided for further treatment of such pulp to extract or recover the oil therefrom constitutes no essential part of this invention as any suitable or well known means may be provided for this purpose, such as are ordinarily used for the recovery of vegetable oils from oil bearing materials. As an example of one form of such means, however, I have shown a mechanical expeller 98 into which the pulp is delivered from bin 96 through spout 99 controlled by gate means 100. Such expeller is a well known apparatus in the vegetable oil industries and comprises essentially an elongated casing having bars or slats disposed at the sides thereof as indicated at 101 so as to define narrow slits through which the oil may be expelled. The pulp is forced through the casing by means of a screw propelling device which develops such a pressure inside the casing as to expel through said slits a considerable portion of the oil contained in the pulp, such slits being so small as to prevent passage of the pulp itself therethrough. A trough or receptacle 103 is provided to receive the oil issuing from the expeller, and such oil may be conducted from said receptacle by means of pipe 104, to any desired point for further treatment or handling. Valve 105 may be provided for controlling the flow of oil through said pipe.

The apparatus for recovering the oil from the pulp is shown as further comprising an extractor 107 in which the pulp is subjected to repeated or continual extraction with a volatile solvent for the oil, such as gasoline, carbon tetrachloride, or the like. Said extractor may be of any suitable or well known construction and forms no essential part of the present invention. Said extractor is shown, however, as provided with a pervious supporting member 108 at an intermediate level therein for supporting the pulp, with means 109 and 110 for circulating steam through the lower portion to volatilize the solvent contained therein, and with a reflux condenser 111 connected to the extractor by the vapor lines 112 and 113 and by return line 114 for condensed solvent. A suitable cooling medium such as water may be passed through the condensor as by means of pipes 116 and 117. The pulp delivered from the expeller may be fed into the extractor through chute 118, a cover 119 being provided for tightly closing the charging opening of the extractor when the same has been charged with pulp in this manner. A door 120 may be provided at the side of the extractor for removal of the spent pulp after extraction of the oil therefrom is completed, said pulp being conducted as by means of conveying device 121 to any suitable point for disposal or further handling thereof. A pipe 122 provided with valve 123 leads from the bottom of the extractor for conducting away the extracted oil to any suitable point for further treatment or handling.

The method of my invention may be carried out in the above described apparatus as follows: The olives, which may be subjected to washing or any other desired preliminary operations, are delivered to bin 1, whence they are elevated by elevator 3 to hopper 2. From here the olives may be either fed directly through chute 10 into the de-pulper 8 or delivered through chute 5 into the preliminary crusher 4. The preliminary crushing in said crusher is necessary only when the olives are very tough or dry and is merely for the purpose of lightening the work required in the de-pulper. In any event, the crushing effected in such preliminary crusher is of a relatively coarse nature so as to crush only the pulp of the olives without affecting the pits thereof. If the olives are in a soft or moist condition they may be fed directly to the de-pulper without going through preliminary crusher 4.

In passing through the de-pulper the olives are subjected to a crushing or mashing operation between the rotating arms 23 and the stationary arms or blades 24, which is sufficient to crush the pulp into a mushy condition and substantially completely loosen the same from the pits, without crushing or breaking the pits. This action is facilitated by the sharpened edges 26 of the arms 24. The crushing of the pulp and the loosening thereof from the pits may also be facilitated by the introduction of water or aqueous liquid through pipe 86. This water or aqueous liquid may be introduced in such proportion as to produce a suspension of pulp and water of the desired concentration, taking into consideration the water set free from the pulp in the crushing thereof. The level of the slurry in the de-pulper may be controlled by adjustment of gate means 18 in the discharge chute 17. The pulp is thus reduced to a slurry of pulp particles in water or aqueous liquid with the whole pits also in suspension. The pits themselves also serve as very effective grinding media to further disintegrate the pulp, due to the continual agitation of the mixture of pulp and pits, in a similar manner to the grinding balls in the well known ball mill.

The mixture of pulp slurry and pits discharged from the de-pulper passes to the storage bin 30 from which it is fed at a rate controlled by gate means 32 to the screening apparatus 33. In passing through said screening apparatus the pulp slurry falls through the meshes of the cylindrical screen 35 while the pits are held back by said screen and eventually pass out through chute 41 and are carried away by conveyor 58. The rotating brushes 48 help to force the disintegrated pulp through the mesh of the screen and to dislodge or loosen all of such pulp from the pits. The separation may also be assisted by means of water or aqueous liquid delivered through spray means 55 above the screen or through spray means 56 extending into the lower end of the screen apparatus. In this manner the pulp is completely separated from the unbroken pits so that the pits discharged through chute 41 are in a clean condition and substantially free from pulp.

The pulp slurry is collected in tank 53, such slurry being free from pits and consisting of a finely divided or mushy suspension of the pulpy material of the olives in water or aqueous liquid. Such water or aqueous liquid comprises not only that introduced through pipe 86 and through spray means 55 and 56 but also the water or aqueous liquid liberated or set free from the pulp during the crushing and screening thereof. A certain amount of oil will also be liberated during these operations and will be present in the slurry collected in tank 53. The term "aqueous liquid" is used herein to designate the liquid or liquor resulting from the above operations and consisting principally of water together with varying amounts of soluble substances extracted from the olives.

A portion of the pulp slurry may, if desired, be returned through pipe 88 to the de-pulper 8 for further crushing or to produce a pulp slurry of the desired consistency or characteristics.

The major portion of the pulp slurry, however, is forced by pump 63 through pipe 64 into the filter press 66. The filtrate from this filter press passes to tank 75, in which the oil separated from the pulp up to this stage will separate by gravity from the water or aqueous liquid and rise to the top of said tank, the oil layer in said tank being indicated at A. The oil so separated is of a particularly good grade known as "virgin oil", and may be removed through pipe 77, pump 76, and pipe 79 and subjected to any desired treatment such as drying, settling, or filtering, after which the same is ready for packing as a finished oil. The water or aqueous liquid may be pumped from the bottom of tank 75 by means of pump 83 to the de-pulper or the screening apparatus as above described. A portion of such water or aqueous liquid may be drawn off constantly or at suitable intervals through pipe 91, in order to compensate for the water or aqueous liquid derived from the olives.

The solid product or press cake remaining in the filter press 66 may be dried by blowing with air or steam admitted through pipe 67 or 69 and is then dropped into hopper or storage means 96, by opening up the press and dislodging the cake in any suitable manner. From this point the pulp may, as described, be delivered to any suitable apparatus for extracting or recovering the oil content thereof. Using the apparatus shown for this purpose, however, the pulp which is now substantially free from water is delivered through chute 99 to expeller 98 in which a certain portion of the oil is expressed therefrom, and collected in receptacle 103. The oil so collected may be passed through pipe 104 and subjected to any suitable operations, such as drying, filtering, settling, or the like, after which the same is ready for shipment or storage.

The partly spent pulp from the expeller is then delivered to extractor 107 in which it is subjected in well known manner to repeated or continual extraction with any suitable solvent for olive oil, the oil thus extracted being drawn off at the end of the operation through pipe 122 and the spent cake being removed through door 120. The oil passing through pipe 122 may be handled in a similar manner to that withdrawn through pipe 104, or in any other suitable manner. The spent pulp discharged through door 120 or resulting in any case from whatever methods of oil extraction may be employed, is free from pits or fragments thereof or from other woody or objectionable matter and contains a high percentage of nutritive ingredients. It is also in a state of much less decomposition than the pulp obtained by the ordinary process of manufacturing olive oil, due to the removal of the pits or woody matter and the water therefrom during the earlier portions of the process and the consequent minimum exposure of the pulp to fermentation or other decomposition.

It will be understood of course that the recovery of the oil from the pulp may be effected by other means than the expelling and extracting apparatus above described. For example, the pulp may be heated and the oil expressed therefrom by means of hydraulic presses, in well known manner. It will also be understood that the temperature of the pulp slurry or other material may be controlled as desired throughout the process, suitable heating means being, for example, provided wherever necessary, in order to produce the best results.

I claim:

1. The method of treating olives comprising subjecting the same to a continued crushing operation to remove the pulp from the pits and disintegrate the pulp while maintaining all parts of the olives including the pits, together with all solid and liquid products of such disintegration, in admixture with one another throughout such crushing operation, the intensity of such crushing operation being sufficient to disintegrate the pulp and liberate the aqueous liquid content thereof and a portion of the oil content, but insufficient to crush the pits, resulting in formation of a suspension of uncrushed pits in a slurry containing substantially all portions of the pulp solids and liquids, subsequently separating the pits from said slurry, and then treating the slurry to recover oil therefrom.

2. The method set forth in claim 1, and comprising in addition introducing additional aqueous liquid into admixture with the materials in the crushing operation, so as to increase the fluidity of the slurry formed during crushing.

3. The method of treating olives comprising subjecting the same to a continued crushing operation to remove the pulp from the pits and dsintegrate the pulp while maintaining all parts of the olives including the pits, together with all solid and liquid products of such disintegration, in admixture with one another throughout such crushing operation, the intensity of such crushing operation being sufficient to disintegrate the pulp and liberate the aqueous liquid content thereof and a portion of the oil content, but insufficient to crush the pits, resulting in formation of a suspension of uncrushed pits in a slurry containing substantially all portions of the pulp solids and liquids, subsequently separating the pits from such slurry, then treating said slurry to separate solids, oil, and aqueous liquid contained therein, and introducing aqueous liquid thus separated into admixture with the materials in the crushing operation, so as to increase the fluidity of the slurry formed during crushing.

In testimony whereof I have hereunto subscribed my name this 20th day of February, 1928.

CHARLES V. ZOUL.